United States Patent Office 3,207,801
Patented Sept. 21, 1965

3,207,801
CATALYTIC DEHYDROCYCLIZATION
Vincent J. Frilette, Erlton, Werner O. Hagg, Delaware Township, Camden County, and George W. Munns, Jr., West Deptford Township, Gloucester County, N.J., assignors to Socony Mobil Oil Company, Inc., a corporation of New York
No Drawing. Filed Aug. 7, 1961, Ser. No. 129,513
5 Claims. (Cl. 260—673.5)

This invention relates to a method of producing aromatics from olefinic hydrocarbons using certain special dehydrocyclization catalysts. More particularly, this invention relates to the use of either a high surface area carbon or of an oxide, hydroxide, or salt of a metal such as magnesium, aluminum, zinc, or calcium as a dehydrocyclization catalyst for olefinic hydrocarbons which contain a sequence of carbon atoms capable of forming a benzenoid ring by the closure of not more than one carbon-carbon bond or compounds capable of forming olefinic hydrocarbons containing such a sequence of carbon atoms, whereby aromatic hydrocarbons are produced.

Aromatic hydrocarbons are of considerable importance in modern-day technology. For example, ethyl benzene is needed in vast quantities for the manufacture of polystyrene; millions of pounds of naphthalene are consumed annually for the manufacture of alkyd resins; para-xylene is used in the production of terephthalic acid; etc.

The demand for each specific aromatic hydrocarbon has been met to a large extent by separating the desired aromatic from the complex mixture of hydrocarbons found either in coal tar or, in more recent years, in reformed petroleum naphthas. While at times these sources have provided sufficient quantities of the aromatic as an inexpensive by-product, at other times shortages resulted due either to growth of demand or to curtailment of coking activity. Also, for some hydrocarbons, especially para-xylene, the cost of isolation from a complex mixture has been very high.

Several ways have been devised to augment the supply of aromatic hydrocarbons. Perhaps the most important of these is the commercial reforming of petroleum naphthas to manufacture high octane gasoline. In the latter process, a crude oil distillate is contacted with a catalyst of platinum metal dispersed on alumina to convert naphthenes to aromatic hydrocarbons. This process, however, is highly nonselective and produces all the aromatics within the boiling range of the naphtha. The nonselectivity is a characteristic of the platinum on alumina catalyst which exhibits a "wide spectrum" of activity. Such a catalyst, for example, is capable of isomerizing straight chain paraffins to branch chain paraffins; and it is able to convert a pure para-xylene to an equilibrium mixture of all the xylenes and other aromatics. Such "wide-spectrum" behavior, while valuable for the manufacture of gasoline, is ill-suited for the preparation of specific aromatic hydrocarbons.

In a recent patent application, Serial No. 41,048, filed July 6, 1960, now abandoned, there is described the use of certain "narrow-spectrum" catalysts to promote reaction between sulfur dioxide and certain paraffinic or olefinic hydrocarbons to produce aromatic hydrocarbons of predictable structures. Among the catalysts suitable for such reaction are solids such as magnesium oxide. The unusual selectivity is believed to derive essentially from the "narrow-spectrum" character of the catalyst. As an example of a narrow spectrum catalyst, in contrast with platinum on alumina, magnesium oxide does not catalyze the skeletal isomerization of either the charged hydrocarbon or the aromatics produced. Thus, the use of narrow-spectrum catalysts is well suited to the production of important specific aromatic hydrocarbons.

Accordingly, it is an object of our invention to provide a method for producing aromatics by dehydrocyclization of certain specific olefinic hydrocarbons in the presence of a narrow-spectrum catalyst.

Another object is to provide a method for the dehydrocyclization of certain specified olefinic hydrocarbons in the presence of a narrow-spectrum catalyst whereby aromatics of predictable structure are formed.

Additional objects will become apparent hereinafter.

In accordance with one aspect of our invention we have found that if the narrow-spectrum catalyst is either a high surface carbon or a metal compound wherein the metal portion is either magnesium, aluminum, zinc, or calcium, such catalyst functions in a highly selective manner as a dehydrocyclization catalyst for certain olefinic hydrocarbons, so that aromatics of predictable structure will result therefrom. In particular, when a metal compound is used as the narrow-spectrum catalyst it may be either an oxide, hydroxide, or salt of an acid characterized by a dissociation constant of less than $1 \times 10^{-2}$, so that such metal salts as carbonates, sulfides, sulfites, acetates, and oxalates are suitable.

We have found that hydrocarbons which contain at least one olefinic double bond and a sequence of carbon atoms capable of forming a benzenoid ring by the closure of not more than one carbon-carbon bond or compounds capable of forming olefinic hydrocarbons containing such a sequence of carbon atoms may be converted to aromatic hydrocarbons in a highly selective manner by contacting the olefinic hydrocarbon at elevated temperatures with such narrow spectrum catalyst. The narrow spectrum catalyst is capable of a highly selective sustained activity for the release of molecular hydrogen when brought into contact at elevated temperatures with a hydrocarbon of the type described. It should be emphasized that the narrow spectrum catalyst, under the conditions required to form aromatic hydrocarbons, shows little activity for the rearrangement of regrouping of carbon atoms either within or among hydrocarbon molecules other than that required to form an aromatic ring.

Pure hydrocarbons which may be used include specifically (a) diisobutylene(2,4,4-trimethyl pentene) and (b) those hydrocarbons which contain a sequence of carbon atoms capable of forming a benzene ring by closure of not more than one carbon-carbon bond and hydrogen abstraction. Mixtures of hydrocarbons, providing at least one of their number meets the aforementioned requirements, may be utilized.

Examples of typical materials which may be used include: octene-1; hexene-2; 2,5-dimethylhexene-2; 2,5-dimethyl hexadiene-1,5; 2,5-dimethyl hexadiene-2,4; 1,5-hexadiene; 2,4-hexadiene; cyclohexene; cyclohexadiene; vinylcyclohexene; hexyne; isobutylene trimers; and 1-phenyl butene-3.

If 1-phenyl butene-3 is the olefin, then the closure of the olefinic side chain on the aromatic nucleus forms a second ring, as shown.

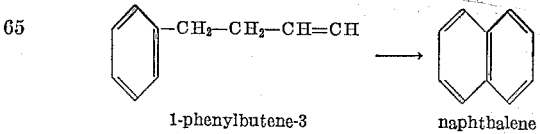

1-phenylbutene-3      naphthalene

Complex hydrocarbon mixtures may be treated by the present process to produce aromatization. Such charges include naphthas of various types which contain substantial quantities of olefins.

Another class of hydrocarbons of special interest includes materials not containing a six numbered chain but which still are capable of forming aromatic. An example of this class is diisobutylene (2,4,4-trimethyl pentene). The conversion of diisobutylene is found to produce substantial quantities of para-xylene as the only 8-carbon aromatic. Although the mechanism of this conversion is not fully understood, it appears that a thermal fragmentation of diisobutylene occurs under the conditions required for aromatization, and that these fragments recombine to produce substantial quantities of 2,5-dimethyl hexadiene, that is, an olefinic hydrocarbon having a sequence of carbon atoms capable of forming a benzenoid ring by the closure of not more than one carbon-carbon bond. The hexadiene is then converted catalytically to the para-xylene by the narrow-spectrum catalyst.

Diene or polyene hydrocarbons, either aliphatic or cycloaliphatic, are well suited as charge materials for the process of this invention. Particular attention is given to the exclusive formation of para-xylene from dienes such as

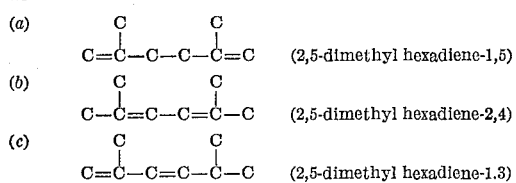

Para-xylene, a particularly valuable aromatic, is readily separated in high purity from the products of the present process due to the substantial absence of meta-xylene.

As stated previously, the narrow spectrum catalysts of the present invention include, in addition to high surface area carbons, metal oxides, hydroxides, and salts of acids characterized by a dissociation constant of less than $1 \times 10^{-2}$, wherein the metal portion is either magnesium, aluminum, zinc, or calcium. Generally, we prefer to use a metal oxide as the catalyst. When alumina is used as the narrow spectrum catalyst it is desirable that such acid-inducing impurities as silica and/or halogens be essentially absent therefrom. Aluminas prepared in the presence of silica, for example, exhibit considerable activity for the rearrangement of carbon skeletons, cracking, polymerization, etc., and are not narrow-spectrum catalysts. In contrast, aluminas prepared in such a manner as to exhibit a highly selective, sustained activity for the release of molecular hydrogen from olefins and diolefins at elevated temperatures, however, are suitable for the process of this invention. Such aluminas can be prepared, for example, by impregnating a high-purity alumina with an alkali metal compound such as a hydroxide, carbonate, sulfide, oxalate, or the like in an amount of from about 0.1 to 1.5 grams of alkali metal ion per 100 grams of alumina, drying, and calcining. Or alternatively, a "non-narrow spectrum" alumina can be treated, either prior to or during the catalytic reaction, at the reaction temperature with a small amount of an amine such as ammonia, methylamine, trimethylamine, pyridine, quinoline, etc. to thereby neutralize any acid-inducing impurities.

The activity of the narrow spectrum catalysts of our invention generally is favored by increased surface area. Of course, the surface area range will vary depending upon the nature of the particular narrow spectrum catalyst used. The following ranges are typical for the various narrow spectrum materials.

| Material: | Surface area (square meters/gram) |
|---|---|
| Carbon | 500 to 1500 |
| Magnesia | 1 to 200 |
| Alumina | 100 to 700 |
| Zinc oxide | 0.01 to 10 |
| Calcium oxide | 0.01 to 5 |

At the elevated temperatures required for the present process, e.g. 900° F.–1000° F., many salts (such as carbonates, acetates, sulfides, oxalates, etc.) are converted to the corresponding oxides, hydroxides, and carbonates, or mixtures thereof.

Naturally occurring minerals provide abundant and inexpensive catalysts for our process. These minerals include dolomite, from which magnesia may be extracted, magnesite, etc. The surface area required for effective catalysis is considerably less than 100 m²/g. However, lower surface area materials will of course have a lower activity level.

The metal compound narrow-spectrum catalysts, when rendered inactive by the accumulation of coke deposits, may be regenerated by conventional methods, e.g., by heating in air at a temperature of from about 1100–1500° F. to burn off the coke.

Our process may be carried out by passing the hydrocarbon charge in vapor form over a heated catalyst bed, wherein the catalyst is a narrow-spectrum catalyst as previously defined. The temperature at which the bed is maintained may vary from about 700° F. to about 1300° F. More preferably, the range is from about 900° F. to 1100° F. so as to minimize the formation of gaseous by-products while at the same time maintaining a reasonable level of conversion.

Pressure in the reaction zone may vary within wide limits, e.g., from a negative pressure of virtually zero pounds per square inch absolute (wherein the reaction is carried out under vacuum) up to about 1000 p.s.i.a. A more preferred pressure range is from 14.7 p.s.i.a. (atmospheric) up to about 500 p.s.i.a.

In the practice of our invention the LHSV (Liquid Hourly Space Velocity) of the hydrocarbon charge may vary from about 0.2 to 10. A more preferred range is an LHSV of from about 0.5 to 3.0.

Instead of a fixed catalyst bed, a fluidized bed may be substituted. The latter may provide better yields of desired products in some cases. Another variant of this invention contemplates the use of a raining solids bed, again to better control the temperature and selectivity for desired products.

The catalytic process described herein may be used to convert low grade olefinic hydrocarbons to specific aromatic compounds useful in a wide variety of applications, e.g., as solvents, high grade fuel components, and especially as chemical intermediates for the manufacture of plastics, rubbers, and detergents.

The following examples will further illustrate our invention. All parts are by weight unless otherwise stated.

In the examples, the catalysts were formed into one eighth inch pellets for convenience in handling. Generally 10 percent stearic acid was used to assist in pelleting. In each instance the catalyst was heated in air at from 1200° F. to 1800° F. to decompose surface carbonates and stearic acid binder.

EXAMPLES 1–20

The charge stock was passed at 1 LHSV (cc. per cc. catalyst per hour) over a catalyst bed of ⅛″ pellets of magnesium oxide which was heated by a block to the temperature indicated with an electronically controlled heater. The catalyst was purged with nitrogen before the hydrocarbon was introduced. Gaseous products were condensed with a water condenser and the uncondensed gases passed through an ice trap and either collected in a gaseous receiver or measured through a wet test meter. The results are tabulated in Table I.

While the percent yield of aromatics varies considerably, generally yields of 10 percent or higher were obtained. It will be noted that when the initial charge was a paraffin rather than an olefin (Examples 19 and 20), no aromatics were formed.

Table I
AROMATIZATION OVER EXTRA LIGHT MAGNESIA CATALYST (LHSV=1)

| Ex. No. | Charge Stock | Temperature, °F. | Benzene | Toluene | p-Xylene | m-Xylene | o-Xylene | Ethyl benzene | Other aromatics | Total aromatics |
|---|---|---|---|---|---|---|---|---|---|---|
| 1 | Octene-1 | 1,000 | 1.5 | 2.8 | [2] 0.3 | | 5.8 | 3.9 | | 14.3 |
| 2 | 2-methyl-1,5-hexadiene | 930 | | 0.5 | [2] Trace | | 0.3 | | | 0.8 |
| 3 | ---do--- | 1,000 | 0.2 | 15.5 | [2] 0.3 | | 0.2 | | | 16.2 |
| 4 | 2,5-dimethyl-2,4-hexadiene | 930 | nil | 1.1 | 18.1 | nil | nil | nil | | 19.2 |
| 5 | ---do--- | 1,000 | 1.7 | 6.2 | [2] 19.0 | | 1.8 | nil | | 28.7 |
| 6 | 2,5-dimethyl-1,5-hexadiene | 930 | | 1.6 | 7.8 | 0.6 | nil | nil | | 10.0 |
| 7 | ---do--- | 1,000 | 0.1 | 3.4 | [2] 24.9 | | 1.0 | nil | | 29.4 |
| 8 | 2,4-hexadiene | 930 | 12.6 | 1.2 | C$_8$ Aromatics=0.9 | | | | 2.2 | 16.9 |
| 9 | ---do--- | 1,000 | 20.0 | 2.5 | C$_8$ Aromatics=1.7 | | | | 3.2 | 27.4 |
| 10 | 1,5-hexadiene | 930 | 9.9 | 0.9 | C$_8$ Aromatics=0.6 | | | | 3.2 | 14.6 |
| 11 | ---do--- | 1,000 | 12.6 | 1.7 | C$_8$ Aromatics=0.8 | | | | 1.8 | 16.9 |
| 12 | 2,4,4-trimethyl pentene-1 | 930 | 0.7 | 0.5 | 0.3 | 0.1 | nil | nil | | 1.6 |
| 13 | ---do---[1] | 1,000 | 1.8 | 0.6 | 6.2 | 0.3 | nil | nil | | 8.9 |
| 14 | 2,4,4-trimethyl pentene-2 | 930 | nil | nil | [2] 0.7 | | nil | nil | | 0.7 |
| 15 | ---do--- | 1,000 | nil | 1.0 | [2] 9.7 | | nil | nil | | 10.7 |
| 16 | Cyclohexene | 930 | 1.1 | 0.2 | | | | | | 1.3 |
| 17 | ---do--- | 1,000 | 11.9 | 0.4 | | | | | | 12.3 |
| 18 | Cyclohexadiene-1,3 | 930 | 85.5 | | | | | | | 85.5 |
| 19 | n-Octane | 1,000 | nil | nil | nil | nil | nil | nil | | nil |
| 20 | Cyclohexane | 1,000 | | | | | | | | nil |

[1] A similar experiment using 0.5 LHSV; 1,000° F., etc. gave a total of 10.5% aromatics, of which 10.4% was p/m xylenes.
[2] p/m distribution not determined.

EXAMPLES 21–27

The procedure used was the same as that described for Examples 1–18, however, the catalyst composition was varied as shown in Table II. The hydrocarbon charge was diisobutylene(2,4,4-trimethyl pentene-1) in all instances. The results are tabulated in Table II.

Table II
AROMATIZATION OF DIISOBUTYLENE OVER VARIOUS CATALYSTS (LHSV=1 Temp.=1,000° F.)

| Ex. No. | Catalyst | Benzene | Toluene | p-Xylene | m-Xylene | o-Xylene | Ethyl benzene | Total aromatics |
|---|---|---|---|---|---|---|---|---|
| 21 | U.S.P. MgO | nil | nil | [1] 1.5 | | Trace | nil | 1.6 |
| 22 | Dolomite | nil | 0.5 | [1] 2.0 | | 0.3 | nil | 2.8 |
| 23 | Hi Surface Area Magnesia | nil | 0.6 | [1] 4.3 | | nil | nil | 4.9 |
| 24 | Calcium Oxide | nil | 0.2 | [1] 0.5 | | nil | nil | 0.7 |
| 25 | Zinc Oxide | nil | 0.3 | 4.6 | 0.2 | nil | nil | 5.1 |
| 26 | Aluminum oxide (⅛″ pellets) | nil | 0.3 | [1] 1.0 | | Trace | nil | 1.3 |
| 27 | Lime | nil | 0.4 | [1] 3.3 | | nil | nil | 3.7 |

[1] p/m distribution not determined.

EXAMPLE 28

This example illustrates the use of an activated carbon catalyst. 7.7 grams of activated carbon were placed in a tube reactor and heated to 1050° F. in a nitrogen atmosphere. Then, 12 grams of heptene-1 were passed over the catalyst maintained at 1050° F. over a one hour period. About three grams of liquid were recovered, 50% of this being toluene.

EXAMPLE 29

This example illustrates the conversion of diisobutylene over activated carbon. The catalyst and conditions used in Example 28 were used in the present example, except that diisobutylene was substituted for the heptene-1. About 1.4 grams of liquid were recovered, which analyzed 70% xylene. Independent analysis by infra-red showed that the xylene was essentially free of meta-isomer.

EXAMPLE 30

This example illustrates the conversion of triisobutylene to aromatic hydrocarbons. The procedure used was similar to that described for Examples 1–18. 13.5 grams of magnesium oxide (extra-light grade) were charged to the reactor. Twelve grams of triisobutylene were passed over the catalyst, which was maintained at 1050° F., during a one hour period. About 1.5 grams of liquid were recovered, which analyzed 63% xylenes.

Of course, variations can be made based on the teachings of the above disclosure without departing from the spirit of our invention.

Having thus described our invention, what we desire to secure and claim by Letters Patent is:

1. A process for effecting dehydrocyclization of an olefinic hydrocarbon to thereby produce an aromatic hydrocarbon which consists in bringing, in the absence of sulfur dioxide, a material selected from the group consisting of (1) an olefinic hydrocarbon having a sequence of carbon atoms capable of forming a benzenoid ring by the closure of not more than one carbon-carbon bond and (2) diisobutylene, into contact at a temperature of from about 700° F. to about 1300° F. with a solid porous catalyst consisting of a material selected from the group consisting of magnesium oxide, magnesium hydroxide, and magnesium salts of acids characterized by a dissociation constant of less than $1 \times 10^{-2}$.

2. The process of claim 1 wherein the catalyst is magnesia.

3. The process of claim 2 wherein the magnesia has a surface area of from about 1 to 200 square meters per gram.

4. The process of claim 1 wherein the reactant is diisobutylene.

5. The process of claim 1 wherein the reactant is 2,5-dimethyl hexadiene.

References Cited by the Examiner

UNITED STATES PATENTS

| | | | |
|---|---|---|---|
| 1,851,726 | 3/32 | Pier et al. | 260—073 |
| 1,863,212 | 6/32 | Winkler | 260—073 |
| 2,212,112 | 8/40 | Clansen | 260—673.5 X |
| 2,378,209 | 6/45 | Fuller et al. | 260—073.5 |
| 2,423,418 | 7/47 | Stone et al. | 260—680 |
| 2,894,046 | 7/59 | Bloch et al. | 260—673.5 |
| 2,898,388 | 8/59 | Maloney et al. | 260—073.5 |
| 2,941,016 | 6/60 | Schmetterling et al. | 260—673.5 |
| 2,972,643 | 2/61 | Kimberlin et al. | 260—673.5 X |
| 2,985,693 | 5/61 | Probst et al. | 260—673.5 |
| 3,002,035 | 9/61 | Hieronymus | 260—673.5 |
| 3,002,036 | 9/61 | Hieronymus | 260—673.5 X |

FOREIGN PATENTS

| | | |
|---|---|---|
| 538,417 | 3/57 | Canada. |
| 483,185 | 4/38 | Great Britain. |

ALPHONSO D. SULLIVAN, *Primary Examiner.*

UNITED STATES PATENT OFFICE
CERTIFICATE OF CORRECTION

Patent No. 3,207,801 September 21, 1965

Vincent J. Frilette et al.

It is hereby certified that error appears in the above numbered patent requiring correction and that the said Letters Patent should read as corrected below.

In the grant, lines 1 and 2, and in the heading to the printed specification, line 3, for "Werner O. Hagg", each occurrence, read -- Werner O. Haag --; column 3, line 5, for "aromatic" read -- aromatics --.

Signed and sealed this 7th day of June 1966.

(SEAL)
Attest:

ERNEST W. SWIDER
Attesting Officer

EDWARD J. BRENNER
Commissioner of Patents